US011115409B2

(12) United States Patent
Shattuck et al.

(10) Patent No.: US 11,115,409 B2
(45) Date of Patent: Sep. 7, 2021

(54) USER AUTHENTICATION BY EMOTIONAL RESPONSE (71) Applicant: International Business Machines Corporation, Armonk, NY (US)

(72) Inventors: Susannah Shattuck, San Francisco, CA (US); Annabella Cavello, San Francisco, CA (US); Barak Krakauer, San Francisco, CA (US); Ryan R. Anderson, San Francisco, CA (US); Al Chakra, Apex, NC (US); Hugh G. Kohl, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 16/163,909

(22) Filed: Oct. 18, 2018

(65) Prior Publication Data
US 2020/0128004 A1 Apr. 23, 2020

(51) Int. Cl.
*H04L 29/06* (2006.01)
*G06N 3/08* (2006.01)
*G06N 3/04* (2006.01)

(52) U.S. Cl.
CPC ........... *H04L 63/0861* (2013.01); *G06N 3/04* (2013.01); *G06N 3/084* (2013.01)

(58) Field of Classification Search
CPC ....... H04L 63/0861; G06N 3/04; G06N 3/084
USPC .......................................................... 726/7
See application file for complete search history.

(56) References Cited

U.S. PATENT DOCUMENTS

| 5,412,738 | A | 5/1995 | Brunelli et al. |
| 7,249,263 | B2 | 7/2007 | Chaudhari et al. |
| 9,547,763 | B1 | 1/2017 | Avital |
| 10,217,023 | B1* | 2/2019 | Rubin ................. G06N 3/0675 |
| 2002/0171673 | A1* | 11/2002 | Brown .............. H04M 15/8038 715/700 |
| 2003/0154406 | A1* | 8/2003 | Honarvar .......... G06Q 20/4014 726/10 |

(Continued)

OTHER PUBLICATIONS

Epp,"Identifying Emotional States using Keystroke Dynamics",May 2011, ACM, pp. 715-724 (Year: 2011).*

(Continued)

*Primary Examiner* — David J Pearson
*Assistant Examiner* — Gregory A Lane
(74) *Attorney, Agent, or Firm* — Law Office of Jim Boice (57) ABSTRACT

A method authenticates a user in order to activate an access mechanism for a device. One or more processors detect a real-time initial emotional state of the user, where the real-time initial emotional state of the user dynamically changes over time. The processor(s) present content as a stimulus to the user, and predict a predicted post-stimulus emotional state of the user, where the predicted post-stimulus emotional state of the user is predicted to be caused by the content being presented to the user, and where the predicted post-stimulus emotional state is dependent upon the real-time initial emotional state of the user. The processor(s) detect a real-time post-stimulus emotional state of the user. The processor(s) match the predicted post-stimulus emotional state of the user to the real-time post-stimulus emotional state of the user, and then authenticate the user and activate an access mechanism for a device.

19 Claims, 8 Drawing Sheets

(56) References Cited

U.S. PATENT DOCUMENTS

| | | |
|---|---|---|
| 2010/0095371 A1 | 4/2010 | Rubin |
| 2010/0229230 A1* | 9/2010 | Edeki ............... G06F 21/31 726/7 |
| 2013/0139238 A1* | 5/2013 | Ryan ............... H04L 63/08 726/7 |
| 2013/0304681 A1* | 11/2013 | Hunzinger ........... G06N 3/049 706/16 |
| 2014/0223462 A1* | 8/2014 | Aimone ............ G16H 40/67 725/10 |
| 2015/0142891 A1* | 5/2015 | Haque ............. H04W 12/06 709/204 |
| 2016/0063235 A1 | 3/2016 | Tussy |
| 2016/0078869 A1 | 3/2016 | Syrdal et al. |
| 2016/0374605 A1* | 12/2016 | Pandian ............ G06K 9/3233 600/323 |
| 2017/0108236 A1* | 4/2017 | Guan ............... H05B 47/105 |
| 2017/0169231 A1 | 6/2017 | Chhabra et al. |
| 2017/0228526 A1 | 8/2017 | Cudak et al. |
| 2017/0346817 A1 | 11/2017 | Gordon et al. |
| 2017/0372056 A1 | 12/2017 | Narasimhan |
| 2018/0284757 A1* | 10/2018 | Celia ............... H04L 1/0002 |
| 2018/0314879 A1* | 11/2018 | Khwaja ............. A61B 5/02405 |
| 2019/0034711 A1* | 1/2019 | Kayhani ............ H04N 7/181 |

OTHER PUBLICATIONS

P. Mell et al., "The Nist Definition of Cloud Computing", National Institute of Standards and Technology, Information Technology Laboratory, Sep. 2011, pp. 1-7.

Chuang J., Nguyen H., Wang C., Johnson B. (2013) I Think, Therefore I Am: Usability and Security of Authentication Using Brainwaves. In: Adams A.A., Brenner M., Smith M. (eds) Financial Cryptography and Data Security. FC 2013. Lecture Notes in Computer Science, vol. 7862. Springer, Berlin, Heidelberg.

C. Chandler et al., "Biometric Measurement of Human Emotions", 5th IEEE International Conference on Advanced Computing & Communication Technologies [ICACCT-2011], pp. 164-168.

Sampangi et al., "(Can't) Lie to Me: Using Micro Expressions for User Authentication", Symposium on Usable Privacy and Security (SOUPS) 2014, Menlo Park, CA, pp. 1-2.

S. Turabzadeh et al., "Facial Expression Emotino Detection for Real-Time Embedded Systems", Technologies 6, 17, 2018, www.mdpi.com, pp. 1-18.

\* cited by examiner

USER AUTHENTICATION BY EMOTIONAL RESPONSE

BACKGROUND

The present invention relates to the field of authentication for a user of a resource, and particularly to the field of authenticating a user based on the user's emotional response to content. Still more particularly, the present invention relates to authenticating a particular user based on a current emotional context of the particular user before being presented with emotionally stimulating content.

SUMMARY

In an embodiment of the present invention, a method authenticates a user in order to activate an access mechanism for a device. One or more processors detect a real-time initial emotional state of the user, where the real-time initial emotional state of the user dynamically changes over time. The processor(s) present content to the user as a stimulus to the user, where the content is presented after the user is in the real-time initial emotional state. The processor(s) predict a predicted post-stimulus emotional state of the user, where the predicted post-stimulus emotional state of the user is predicted to be caused by the content being presented to the user, and where the predicted post-stimulus emotional state is dependent upon the real-time initial emotional state of the user. The processor(s) detect a real-time post-stimulus emotional state of the user, where the real-time post-stimulus emotional state of the user is caused by the content being presented to the user, and where the real-time post-stimulus emotional state is dependent upon the real-time initial emotional state of the user. The processor(s) match the predicted post-stimulus emotional state of the user to the real-time post-stimulus emotional state of the user. In response to the real-time post-stimulus emotional state of the user matching the predicted post-stimulus emotional state of the user, the processor(s) authenticate the user and activate an access mechanism for a device.

In one or more embodiments, the method(s) described herein are performed by an execution of a computer program product and/or a computer system.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
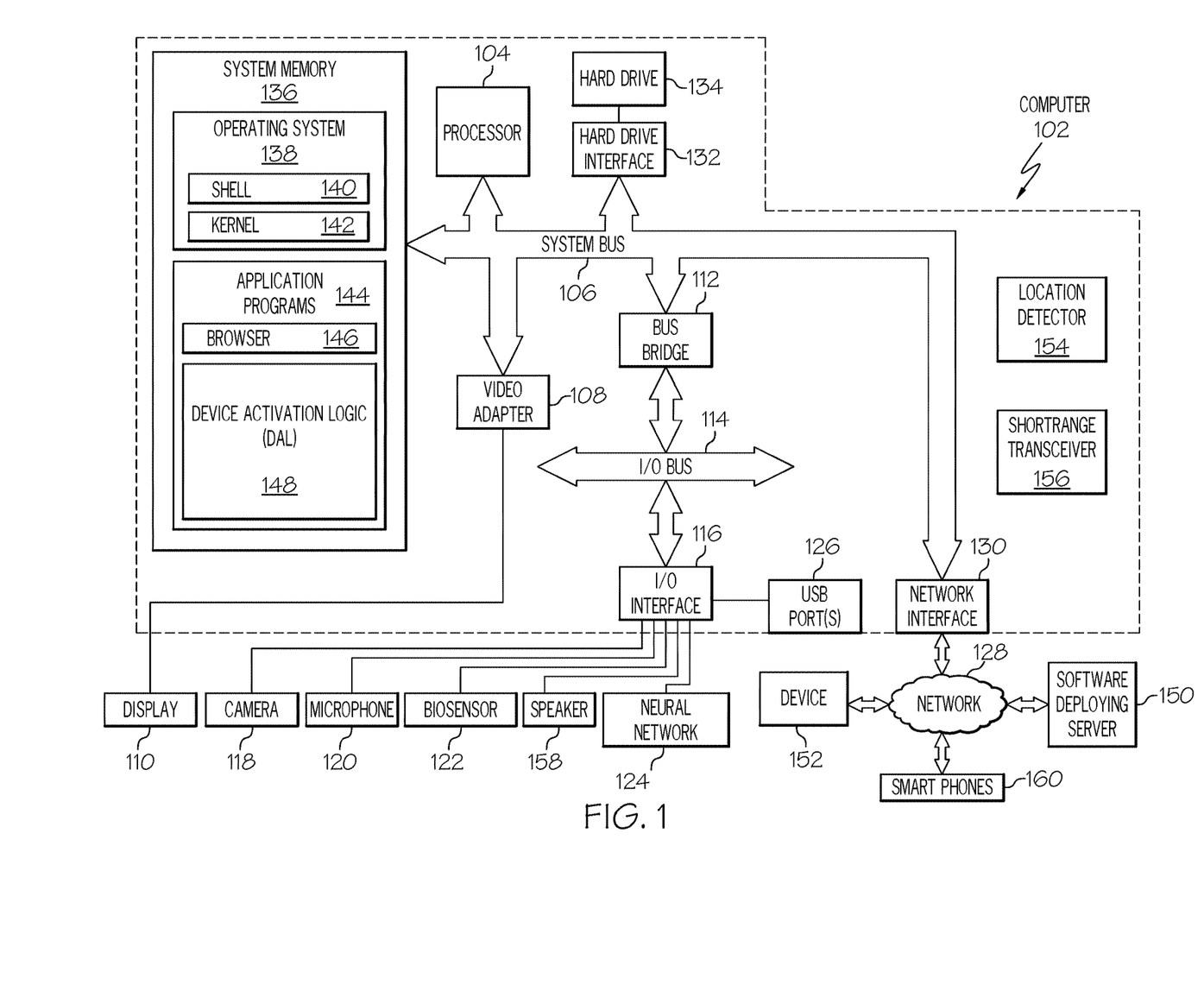
FIG. 1 depicts an exemplary system and network in which the present invention is implemented in one or more embodiments.

With reference now to the figures, and in particular to FIG. 1, there is depicted a block diagram of an exemplary system and network that is utilized by and/or in the implementation of the present invention. Note that some or all of the exemplary architecture, including both depicted hardware and software, shown for and within computer 102 are utilized by software deploying server 150 and/or device 152 and/or smart phone 160 in various embodiments of the present invention.

Exemplary computer 102 includes a processor 104 that is coupled to a system bus 106. In an embodiment of the present invention, processor 104 utilizes one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a camera 118 (which is a still image digital camera and/or a video digital camera), a microphone 120, a biosensor 122 (e.g., a sensor that detects a heart rate, temperature, electrocardiogram (ECG), electroencephalogram (EEG), and/or other biometric readings for a user), a neural network 124 (described in greater detail in an exemplary embodiment depicted in FIG. 5), a speaker 158 (that produces audible sounds based on an audio file being processed by an amplifier (not shown)), and external USB port(s) 126. While the format of the ports connected to I/O interface 116 is any known to those skilled in the art of computer architecture, in one embodiment some or all of these ports are universal serial bus (USB) ports.

As depicted, computer 102 is able to communicate with a software deploying server 150 and/or device 152 and/or smart phone 160 using a network interface 130. Network interface 130 is a hardware network interface, such as a network interface card (NIC), etc. In an embodiment of the present invention, network 128 is an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing.

Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Device Activation Logic (DAL) 148. DAL 148 includes code for implementing the processes described below, including those described in FIGS. 2-6. In one embodiment, computer 102 is able to download DAL 148 from software deploying server 150, including in an on-demand basis, wherein the code in DAL 148 is not downloaded until needed for execution. Note further that, in one embodiment of the present invention, software deploying server 150 performs all of the functions associated with the present invention (including execution of DAL 148), thus freeing computer 102 from having to use its own internal computing resources to execute DAL 148.

In one or more embodiments of the present invention, coupled to computer 102 via network 128 is a device 152, which is a remote device that the present invention activates after authenticating a particular user. In one or more embodiments, device 152 is a storage system, an electro-mechanical door to a restricted area, a remote server, a mechanical device such as a pump in a refinery, etc.

Also within computer 102 in one or more embodiments of the present invention is a location detector 154, which detects a geophysical location of the computer 102. An exemplary location detector 154 is a global positioning system (GPS) that uses multiple space satellites to triangulate the real-time location of computer 102.

Also within computer 102 in one or more embodiments of the present invention is a short-range transceiver 156 that is able to exchange electronic signals only to other computer-based systems that are within a predefined range (e.g., less than 10 meters). An exemplary short-range transceiver 156 comports with the Institute of Electrical and Electronics Engineers (IEEE) standard 802.15.x.

In one or more embodiments of the present invention, coupled to computer 102 via network 128 is a smart phone 160, which is a telecommunication device that is capable of sending and receiving text messages, sending and receiving email, taking and transmitting photos, playing audio and/or audio-video content, browsing the Internet, etc.

Note that the hardware elements depicted in computer 102 are not intended to be exhaustive, but rather are representative to highlight essential components required by the present invention. For instance, in one or more embodiments of the present invention computer 102 includes alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention provide improved user authentication for use of a device by leveraging physical characteristics (e.g., involuntary somatic response) and context awareness (e.g., network relationships) to provide additional depth to user authentication and improved security.

Increasingly, biometric data (e.g., a fingerprint or face scan) is being used as a method of user authentication. This data, however, is relatively static and is susceptible to attacks that mimic the features that the biometric system is trained on, such as still pictures of the user, or masks.

Thus, one or more embodiments of the present invention use additional contextual information about users (such as emails, social data, company chat, etc.), in order to provide depth to the interpretation of biometric data. This effectively narrows the possible inputs accepted for authentication at a given time.

The present invention therefore addresses the vulnerabilities of biometric systems by including the detection of emotional reactions in context, providing additional layers for authentication, and not relying on saved representations (e.g., facial photographs, voice prints, etc.) of the user. That is, while one or more embodiments of the present invention utilize saved photos, etc. of the user, other embodiments rely on the change to the representation (e.g., image) of the user caused by exposure to a certain stimulus.

Stated another way, in one or more embodiments the present invention relies on a response to a certain stimulus based on a current emotional state of the user. Therefore, it is the change in the person's appearance, biometrics, etc. when responded to a certain stimulus that authenticates the identity of the person.

In one or more embodiments, the present invention utilizes a biometric measurement of an emotional response of a user when exposed to a stimulus in order to authenticate the identity of the user. In various embodiments of the present invention, the user's emotional response is measured through biometric data analysis. Examples of such biometric data includes data that represents (in real time) the user's blood pressure (e.g., by using a digital device that functions as a sphygmomanometer), heart rate (e.g., by using a digital device that aurally detects a heart rate), sweat rate (e.g., by using a digital device that measures skin conductivity—galvanic skin resistance), body heat (e.g., by using a digital device that measures a change in facial skin flushing), facial changes (e.g., by using a digital device that measures changes, including micro-expression changes in the shape of a person when exposed to a stimulus), muscle tension (e.g., by using a digital device that measures muscle tension using electromyography), etc. These biometric data readings are exemplary biometric data readings performed by the biosensor 122 shown in FIG. 1.

As described herein, one or more embodiments of the present invention detect a response to a stimulus for a particular user who is in a particular current emotional state in order to authenticate a response to the stimulus. For example, in an embodiment of the present invention the stimulus is a photograph of a fast car. Ordinarily, the user would smile when looking at the fast car (assuming that the profile of the user shows that the user likes fast cars). However, if the user has been in an automobile accident 24 hours earlier, then the photo of the fast car evokes a grimace from the user, as he/she is reminded of the auto accident. Thus, the present invention relies on the emotional state of the user before being shown the photo (e.g., "anxious"), and detects the emotional state of the user after being shown the photo (e.g., "alarmed") in order to authenticate the identity of the user. As such, one or more embodiments of the present invention do not need a stored photo of the user to compare to, as is required by a traditional face recognition system. Rather, it is the change in the person's facial expression in response to being exposed to the stimulus (e.g., photo) that, based on the current context of the user, authenticates the user.

In an embodiment, the stimulus to the user (used to elicit an emotional response) is an image, a sound, a text, etc. The context that is used to determine the user's (pre-stimulus) state is extracted from recent text data generated by the user (e.g., social media posts that are evaluated using natural language processing in order to determine a current emotional state of the user based on the language, context, sentiment, etc. of the posts); a current geophysical location of the user; persons with whom the user is currently in proximity with; etc.

In one or more embodiments of the present invention, a network/graph analysis is applied in order to understand a user's relationship to other people or entities, thus providing the system with the ability to enable a more strategic and thorough understanding of what emotional response to expect/predict. In one or more embodiments of the present invention, social media, company organization data, and even transactional information are used to determine the emotional content (or change to that content) over time.

In one or more embodiments of the present invention, a social graph is used to generate text, images, or other prompts that are predicted to generate an emotional response. Thus, a prompt is generated from the user's social graph, rather than pre-selected by the user.

In one or more embodiments of the present invention, the user's emotional response is determined by a pre-selected stimulus. In this embodiment, the user selects an image or some other stimulus. The system collects biometric data from the user (e.g., micro-expressions, somatic response, etc.) shortly before and shortly after the stimulus is presented in a variety of contexts (e.g. different times, locations). Leveraging machine learning techniques to uncover patterns in the user's biometric data before and after exposure to this stimulus, the system identifies the features unique to the user's emotional response. During authentication of the user, the user is exposed to a particular stimulus. The authentication system then searches through contextual data to which the user has given the system access to make a prediction about the emotional response that the given stimulus is expected to elicit. If the user's biometric data reasonably match the prediction made by the system, the user is authorized to access the device.

In one or more embodiments of the present invention, the system selects a new stimulus with each use, in an effort to trigger a certain emotional response from the user. The system is able to access contextual data about the user to determine which image or stimulus will elicit a strong emotional response at any given time (e.g., an image of the user's brand new pet is expected to elicit a strong joyful response in the user shortly after the pet has been adopted).

In one or more embodiments of the present invention, the system (e.g., a user's smart phone) pre-configures a model of the user, which preferably resides within the system. The system presents the user with examples of stimuli over time, taking into account contextual data (i.e. social feeds, email communications, chat logs, etc.), and builds a machine learning model that can recognize and predict biometric response of the user to certain stimuli based on context.

Once the model of the user has been pre-configured, a user is presented with, at time of login to the system, a stimulus that the system has determined will elicit a certain emotional response based on the pre-stimulus emotional state of the user.

Thus, the present invention provides users with a new and useful way to authenticate that does not fall prey to the usual pitfalls of context-less biometrics.

The present invention provides security systems with a new and useful way to automate the generation and selection of authentication criteria.

In one or more embodiments, the present invention makes use of a login system (optionally in concert with other means of authentication) that results in a biometric system of authentication that is immune to attacks based on the use of photographs, masks, or other means of imitating simple physical characteristics. As such, the present invention provides increasing security through an additional layer of authentication that is difficult to spoof.

For example, and in an embodiment of the present invention, the system measures the user's biometric data (e.g., using the biosensor 122 shown in FIG. 1) and its context shortly before and after he or she is presented with the stimulus.

If the user's biometric information changes in a way similar to the patterns learned during the pre-configuration training and expected/predicted based on contextual data analyzed during the attempted log-in, then the user is permitted to access the resource.

Figure 2:
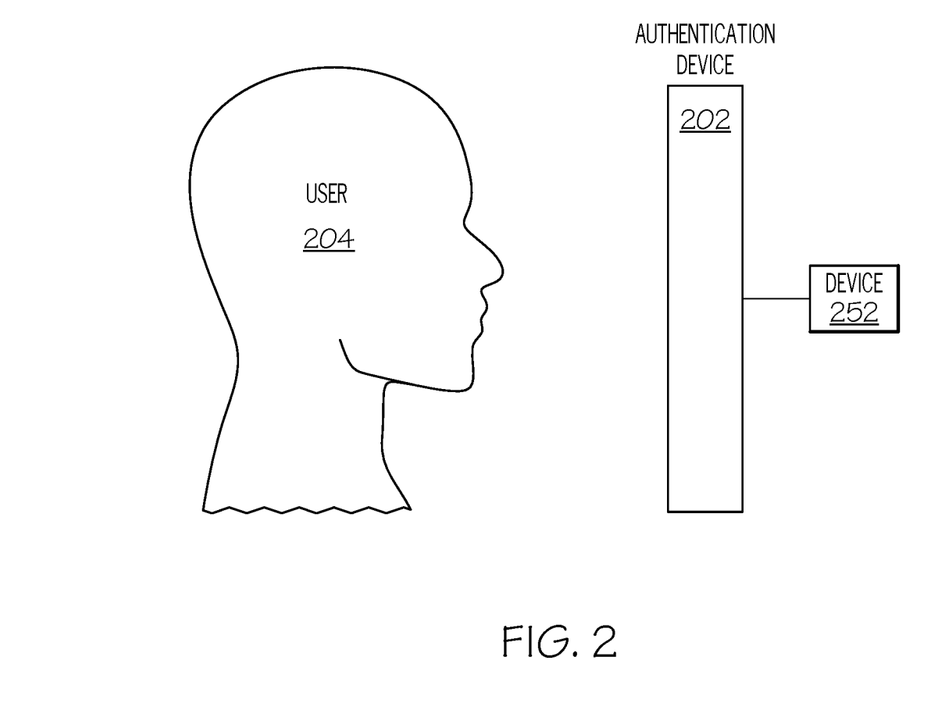
FIG. 2 depicts a user interacting with an exemplary authentication device in accordance with one or more embodiments of the present invention.

With referenced now to FIG. 2, assume that a user 204 is trying to authenticate his/her identity to an authentication device 202 (analogous to computer 102 shown in FIG. 1). That is, in one or more embodiments of the present invention the authentication device 202 is a device that has logic for selectively allowing user 204 to activate (e.g., unlock) a particular resource. For example, and in an embodiment of the present invention, authentication device 202 is the particular resource itself (e.g., a smart phone), such that the authentication device 202 and the smart phone are the same device. In another embodiment, however, the authentication device 202 is a device that allows user 204 to activate (e.g., unlock) and/or access another device 252 (analogous to device 152 shown in FIG. 2), such as a lock on a door to a restricted area, a remote database, a remote server, mechanical equipment (e.g., a pump), etc.

Figure 3:
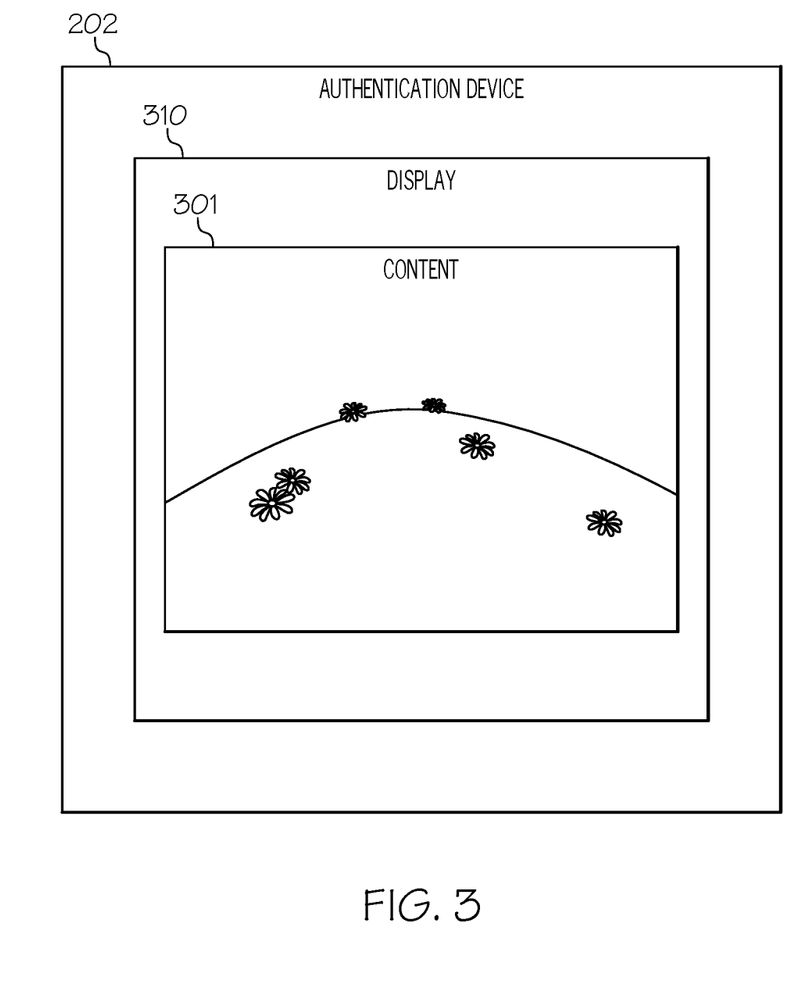
FIG. 3 illustrates an exemplary content being displayed on an authentication device in accordance with one or more embodiments of the present invention.

With reference now to FIG. 3, assume that content 301 being shown on a display 310 (analogous to display 110 shown in FIG. 1) is displayed on the authentication device 202 shown in FIG. 2. The content 301 depicted in FIG. 3 is a picture of a grassy hillside. Usually, this picture will cause the user to smile (or perhaps relax his/her face), since the image is so serene. However, assume now that the user has just returned from a sad event outside. As such, the picture of the grassy hillside will remind the user of that sad event, thus causing him/her to frown.

Thus, the response of the user to a same stimulus (e.g., the picture depicted in FIG. 3 as content 301) will evoke a different response from the user based on a current (pre-stimulus) emotional state of the user.

In an embodiment of the present invention, content 301 is chosen randomly. That is, the content 301 itself is randomly chosen. However, the user's reaction to that particular content 301 is based on the user's current (dynamically changing) emotional state. As such, a randomly chosen picture of a grassy hillside (as shown in FIG. 3) will evoke a reaction of peacefulness in most persons, but will evoke a reaction of sadness in a user who has just returned from a sad event (e.g., a memorial) that was held outside.

In an embodiment of the present invention, content 301 is specifically chosen. That is, assume again that the user has just returned from a sad event that was held outside. As such, the system will specifically choose the grassy hillside shown as content 301 for presentation to the user, since the system will assume that such as picture will evoke an emotional reaction of serenity and happiness in another person, but will evoke an emotional reaction of sadness and grief in the current user (based on the current emotional state and activity context of the user).

Figure 4:
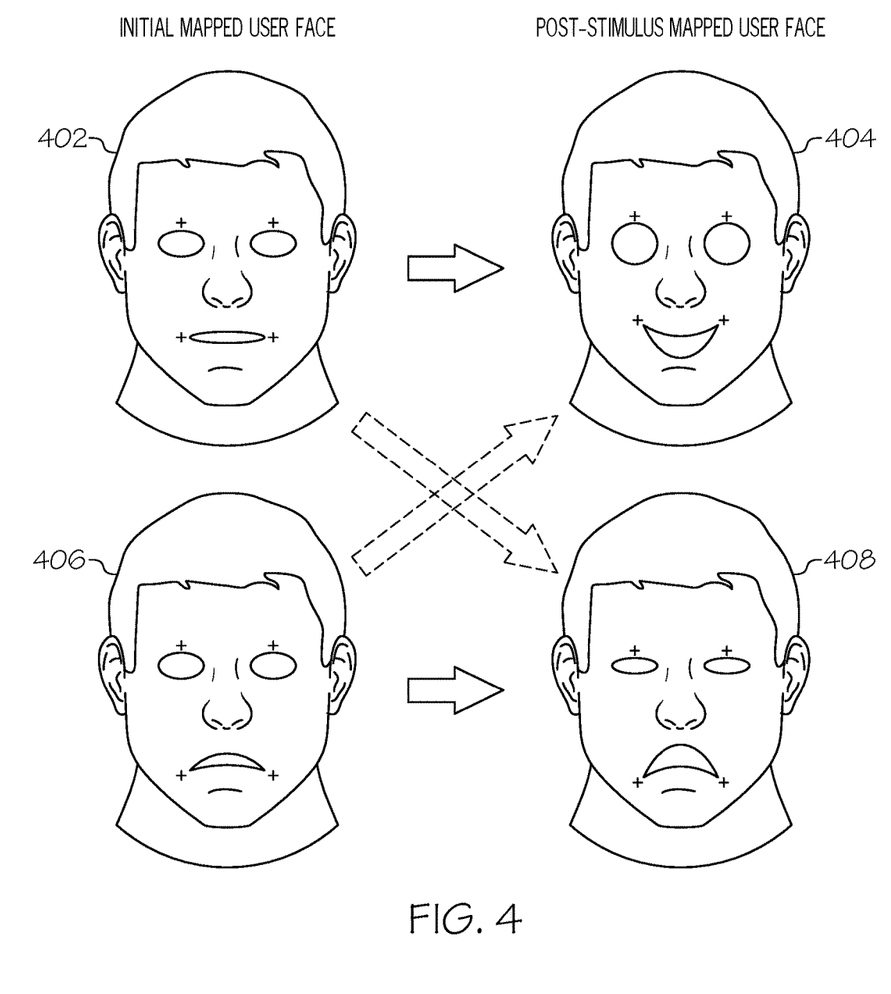
FIG. 4 depicts initial mapped user faces of a user before being presented with content, and alternative post-stimulus mapped faces of the same user in accordance with one or more embodiments of the present invention.

For example, consider now FIG. 4, which depicts an initial mapped user face of a user before being stimulated by content, and alternative post-stimulus mapped faces of the same user in accordance with one or more embodiments of the present invention.

Assume that the initial mapped user face 402 has been captured by camera 118 (shown in FIG. 1) before the content 301 is displayed on the authentication device 202 shown in FIG. 3. As shown in the initial mapped user face 402, the user (e.g., user 204 shown in FIG. 2) initially has a look that is emotion-neutral (e.g., is not happy, sad, angry, etc.). That is, there are no obvious emotional cues in the initial mapped user face 402.

As the name implies, the initial mapped user face 402 has markers (each shown as an "+") that marks a certain point on the face of the user. If, after being shown the content 301 depicted in FIG. 3, the user smiles, then these markers move to different positions, as shown in the post-stimulus mapped user face 404. However, if showing the content 301 to the user causes him/her to frown, then these markers move to positions that are different from those shown in post-stimulus mapped user face 404, as depicted in post-stimulus mapped user face 408.

In another embodiment of the present invention, the user makes a face indicative of a certain emotion that is either reversed or accentuated after being exposed to the content 301. For example, consider the initial mapped user face 406, which shows the user initially frowning (with markers showing the position of the ends of the frown). If, after being shown the content 301 depicted in FIG. 3 the user smiles, then these markers move to the different positions shown in the post-stimulus mapped user face 404, indicating that the user's emotion has changed from being sad to being happy. However, if showing the content 301 to the user causes him/her to frown even more, then these markers move to positions that are different from those shown in the initial mapped user face 406, as depicted in post-stimulus mapped user face 408.

Thus, FIG. 4 illustrates the fact that in one or more embodiments of the present invention, the pre-stimulus emotional state is (see initial mapped user face 406) or is not (see initial mapped user face 402) revealed by the look on the user's face before being shown the stimulus. However, the post-stimulus changes on the user's face clearly show the emotional state of the user after being shown the stimulus, as determined by the movement of the marker(s) (e.g., the depicted instances of "+") between the pre-stimulus and post-stimulus faces.

FIGS. 2-4 describe embodiments in which a visual image (e.g., content 301 shown in FIG. 3) is the type of stimulus that elicits/evokes/educes a certain emotion in the user. In other embodiments, other types of stimuli elicit/evoke/educe a certain emotion in the user.

For example, in an embodiment of the present invention the stimulus used to elicit a particular emotion in the user is text content. For example, assume that the system knows (based on the processes described herein) that the user is feeling very sad at the present time. As such, a poem that usually would evoke a feeling of happiness in that user will instead evoke an expression of sadness, particularly if that poem reminds the user of a negative experience or scenario.

In another embodiment of the present invention, the stimulus used to elicit a particular emotion in the user is audio content. Again, assume that the system knows that the user is feeling very sad at the present. As such, a particular song that would usually evoke a feeling of happiness in that user will instead evoke an expression of sadness, particularly if that song reminds the user of the negative experience or scenario.

In another embodiment of the present invention, the stimulus used to elicit a particular emotion in the user is audio-visual content. Again, assume that the system knows that the user is feeling very sad at the present. As such, a particular video clip that would usually evoke a feeling of happiness in that user will instead evoke an expression of sadness, particularly if that video clip reminds the user of the negative experience or scenario.

Figure 5:
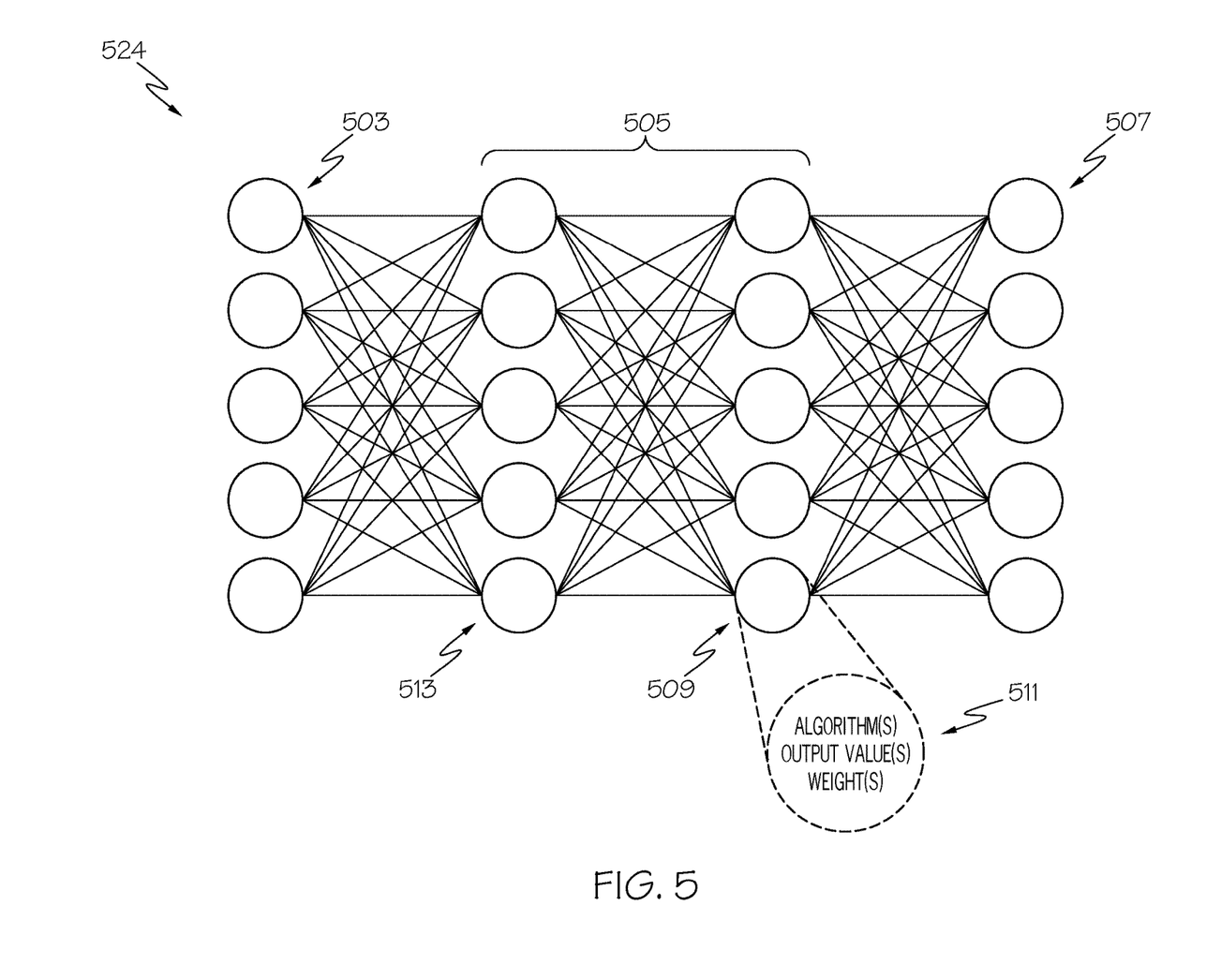
FIG. 5 illustrates an exemplary neural network (NN) as used in one or more embodiments of the present invention.

In one or more embodiments of the present invention, the system predicts how a particular user will emotionally respond to a certain stimulus through use of a neural network (NN), such as the NN 524 (analogous to NN 124 shown in FIG. 1) shown in FIG. 5.

As the name implies, NN 524 is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected other biological neurons.

An electronic neural network similarly is made up of electronic neurons. However, unlike biological neurons, electronic neurons are never technically "inhibitory", but are only "excitatory" to varying degrees.

With reference now to FIG. 5, in NN 524 the electronic neurons are arranged in layers, known as an input layer 503, hidden layers 505, and an output layer 507. The input layer 503 includes neurons/nodes that take input data, and send it to a series of hidden layers of neurons (e.g., hidden layers 505), in which neurons from one layer in the hidden layers are interconnected with all neurons in a next layer in the hidden layers 505. The final layer in the hidden layers 505 then outputs a computational result to the output layer 507, which is often a single node for holding vector information.

As just mentioned, each node in the depicted NN 524 represents an electronic neuron, such as the depicted neuron 509. As shown in block 511, each neuron (including neuron 509) functionally includes at least three features: an algorithm, an output value, and a weight.

The algorithm is a mathematic formula for processing data from one or more upstream neurons. For example, assume that one or more of the neurons depicted in the middle hidden layers 505 send data values to neuron 509. Neuron 509 then processes these data values by executing the algorithm shown in block 511, in order to create one or more output values, which are then sent to another neuron, such as another neuron within the hidden layers 505 or a neuron in the output layer 507. Each neuron also has a weight that is specific for that neuron and/or for other connected neurons.

For example, assume that neuron 513 is sending the results of its analysis of a piece of data to neuron 509. Neuron 509 has a first weight that defines how important data coming specifically from neuron 513 is. If the data is important, then data coming from neuron 513 is weighted heavily, thus causing the algorithm(s) within neuron 509 to generate a higher output, which will have a heavier impact on neurons in the output layer 507. Similarly, if neuron 513 has been determined to be significant to the operations of neuron 509, then the weight in neuron 513 will be increased, such that neuron 509 receives a higher value for the output of the algorithm in the neuron 513. These weights are adjustable for one, more, or all of the neurons in the NN 524, such that a reliable output will result from output layer 507. Such adjustments are alternatively performed manually or automatically.

When manually adjusted, the weights are adjusted by the user, sensor logic, etc. in a repeated manner until the output from output layer 507 matches expectations. For example, assume that input layer 503 receives inputs that 1) describe a real-time emotional state of a user, and 2) the stimulus being presented to the user (e.g., content 301 shown in FIG. 3). In an exemplary input, the input to input layer 503 contains values that are selected to describe the emotion and/or context of the user in real-time, as well as values (e.g., from metadata for the content 301) that describe the stimulus.

That is, assume that NN 524 has been trained (by adjusting the algorithm(s), output value(s) and weight(s) in one or more of the electronic neurons within NN 524) to output a 5-tuple output vector (e.g., 0.9, 0.5, 0.9, 0.3, 0.4) to the output layer 507 indicating sadness whenever a 5-tuple input vector (including 0.3, 0.9, 0.5 indicating that the user was feeling sad before seeing the stimulus due to just returning from a sad event that was held outside, plus 0.7 and 0.4 describing the stimulus as being a bucolic scene) is input into the input layer 503.

If the output from output layer 507 is a vector that is predetermined to describe a certain emotional state for the particular user then the weights (and alternatively the algorithms) are adjusted until the vector generated by output layer 507 has a value that is associated with the appropriate emotion based on the user's pre-stimulus emotional state and the description of the stimulus.

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 507 improves (e.g., gets closer to representing a certain post-stimulus emotion for the user based on his/her pre-stimulus emotion and the description of the stimulus).

Figure 6:
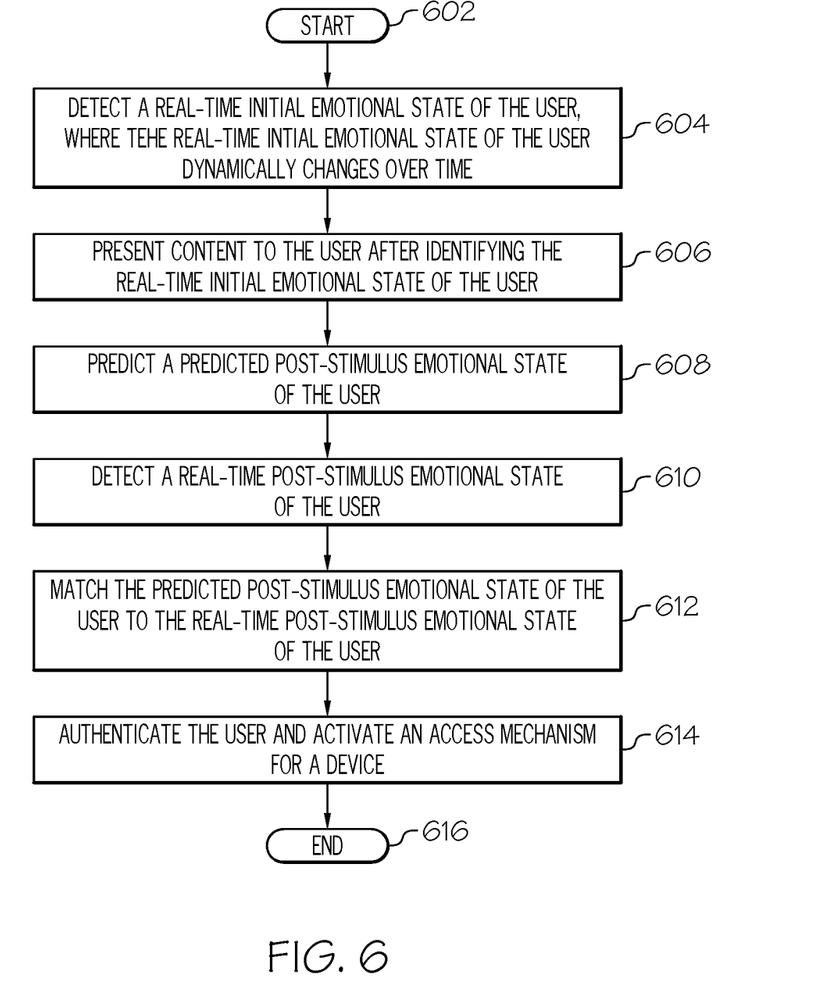
FIG. 6 is a high-level flow chart of one or more steps performed in accordance with one or more embodiments of the present invention.

With reference now to FIG. 6, a high-level flow chart of one or more steps performed in accordance with one or more embodiments of the present invention is presented.

After initiator block 602, one or more processors (e.g., processor 104 shown in FIG. 1) detects a real-time initial emotional state of the user, as described in block 604. The real-time initial emotional state of the user is a current version of an emotional state of the user that dynamically changes over time. As described herein, this real-time initial emotional state is dynamic, not static. That is, the user's emotional state may be one of happiness at a first time, one of sadness at a second time, etc., depending on the user's context, mood, recent experiences, etc.

Based on biometric readings for a user that are captured by biosensor 122, images of a user's face captured by camera 118, timbre, volume, and cadence of a user's voice captured by microphone 120, retrieved from a user's calendar, social media postings, emails, etc., a real-time initial emotional state of the user (e.g., happy, sad, anxious, etc.), whom the user is currently with, where the user is currently located, etc., the system is able to determine a real-time initial (current version of a dynamically changing) emotional state of the user.

As described in block 606, the processor(s) then present content (e.g., content 301 shown in FIG. 3) to the user as a stimulus to the user. As described herein, this content is presented after the user is in the real-time initial emotional state.

As described in block 608, the processor(s) then predict a predicted post-stimulus emotional state of the user. As described herein, the predicted post-stimulus emotional state of the user is predicted to be caused by the content being presented to the user. As also described herein, the predicted post-stimulus emotional state is dependent upon the real-time initial emotional state of the user. That is, if the user is already feeling sad, then the predicted post-stimulus emotional state could be that the user frowns or makes some other negative expression.

As described in block 610, the processor(s) detect an actual real-time post-stimulus emotional state of the user, which is caused by the content being presented to the user, and which is dependent upon the real-time initial emotional state of the user. That is, the real-time post-stimulus emotional state is caused by the same content/stimulus that affects the predicted post-stimulus emotional state of the user, and is dependent upon the same real-time initial emotional state as the predicted post-stimulus emotional state of the user.

As described in block 612, the processor(s) match the predicted post-stimulus emotional state of the user to the real-time post-stimulus emotional state of the user.

As described in block 614, in response to the real-time post-stimulus emotional state of the user matching the predicted post-stimulus emotional state of the user, the processor(s) authenticate the user and activate an access mechanism for a device (e.g., a smart phone is unlocked).

The flow-chart ends at terminator block 616.

In an embodiment of the present invention, the processor(s) retrieve, with the user's express authorization, a calendar of the user to identify a current activity of the user, and then determine the real-time initial emotional state of the user based on the current activity of the user. For example, assume that the calendar for the user shows the user going to a birthday party on the current day. Assume further that the content being presented to that user is a picture of a birthday cake. Assuming that the user had a good time at the birthday party, the system will expect the user to show signs of happiness when shown the picture of the birthday cake. However, assume now that the user's calendar actually indicates that today would have been the birthday of a loved one. In this case, the system will expect the user to show signs of grief when shown the picture of the birthday cake, since it would be a reminder of his/her loss.

Thus, the user's emotional state is dynamic, and not static. That is, at a first time (e.g., a particular day, a week day, morning, etc.) the user might feel anxious. However, at a second time (e.g., another day, a weekend day, evening, etc.) the user might feel relaxed. As such, the user will react differently to a same stimulus in a different manner, depending on the user's current emotional state.

In an embodiment of the present invention, the user's current state is determined by evaluating a user's electronic activities. For example, assume that the user has a smart phone (e.g., smart phone 160 shown in FIG. 1). As such, whenever the user takes a photo, sends/receives a text of email, visits a particular website, listens to a particular song, etc., computer 102 will use this activity context to detect the real-time initial emotional state of the user. That is, if the user just took a photo of a new grandchild, then computer 102 will determine that the user is feeling happy. However, if the user just took a photo of a terrible accident, then computer 102 will determine that the user is feeling anxious or sad. Similarly, recent (e.g., within the past hour or past day) text/email/browsing history of the user of the smart phone is conveyed to the computer 102, which uses this information to determine the current (and thus dynamic) emotional state of the user.

In an embodiment of the present invention, the processor(s) determine a real-time location of the user, and then determine the real-time initial emotional state of the user based on the real-time location of the user. For example, assume that the real-time location of a user of a smart phone is determined (e.g., by location detector 154 shown in FIG. 1) to be in an office location. As such, any response to the presented content/stimulus would be predicted to be professional and subdued. For example, a funny picture might just elicit a smile from the user. However, if the real-time location of the user of the smart phone is determined to be at a nightclub, then any response to the presented content/stimulus would be predicted to be less inhibited. For example, the same funny picture would elicit a loud laugh from the user.

In an embodiment of the present invention, the processor(s) identify other persons who are with the user in real-time, and then determine the real-time initial emotional state of the user based on the other persons who are with the user in real-time. For example, assume that computer 102 shown in FIG. 1 (and thus authenticating device 202 shown in FIG. 2) is a smart phone that includes the short-range transceiver 156 shown in FIG. 1. Assume further that DAL 148 includes a lookup table that identifies the user of any other smart phone that is similarly equipped with a short-range transceiver 156. As such, the DAL 148, when executed, identifies all other persons who are using smart phones within 10 meters of the user of the smart phone depicted as computer 102 shown in FIG. 1. As such, the system will assume that if the user is with peer-group friends, then that user will have a different reaction to a content/stimulus than if the user is with workplace superiors, strangers, etc.

In an embodiment of the present invention, the processor(s) identify a time of day and/or a date for the real-time, and then determine the real-time initial emotional state of the user based on the time of day and/or the date for the real-time. For example, assume that a user is a shift worker who works nights. If the content/stimulus is shown during the day, then the user will likely have an emotional reaction that reflects his/her fatigue (since he/she is sleepy during the day). Similarly, if the content/stimulus is shown during his/her day off, then his/her emotional response to the content/stimulus will be different than if it were presented during his/her work day.

In an embodiment of the present invention, the content that acts as an emotional stimulus to the user is visual content. (See FIG. 3.)

However, in another embodiment, the content is text content (e.g., a poem).

In yet another embodiment, the content is audio content (e.g., a song, a blaring klaxon, nature sounds, etc.).

In yet another embodiment, the content is audio-visual content (e.g., a video clip).

In yet another embodiment, the content is a mixture of visual content, text content, audio content, and/or audio-visual content.

In an embodiment of the present invention, the predicted post-stimulus emotional state of the user is predicted by inputting, by the processor(s), data that describes the real-time initial emotional state of the user and the content into a neural network (NN), such that an output of the NN describes the predicted post-stimulus emotional state of the user. (See FIG. 4.)

In an embodiment of the present invention, the processor(s) determine that the output of the NN fails to describe the predicted post-stimulus emotional state of the user, and then adjust neurons in the NN (e.g., alter the algorithms, weights, and/or outputs of the neurons) until the output of the NN describes the predicted post-stimulus emotional state of the user.

As described herein, the present invention provides numerous advantages over the prior art of authenticating a user (e.g., to unlock an electronic device).

First, the present invention does not rely upon a stored photo of the user to be authenticated. That is, while a photo of the user to be authenticated can be used as an additional security layer, the present invention relies on 1) the user displaying a certain emotion 2) in response to a certain stimulus based on 3) real-time contextual conditions of the user. As such, in one or more embodiments of the present invention the facial features of the user are irrelevant; only the changes to these facial features are relevant to authenticating the user.

Second, the present invention uses context sources to train the system in a way that is hidden from a nefarious actor. For example, the NN 524 that has been trained to authenticate the user is able to use inputs from social media postings, calendars, biometric sensors, geo-locating sensors, whom the user is currently with, etc. A person or system trying to spoof the authentication system described herein will not know what inputs are being used, and thus will not be able to emulate the NN 524 and its use.

Third, the present invention is dynamic, and not static. That is, rather than presume that a user will respond to a particular stimulus in the same way at all times, the present invention assumes that the user will respond to that same particular stimulus in different ways at different times, depending on the current emotional state (as caused by the location, recent experiences, etc.) of the user.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
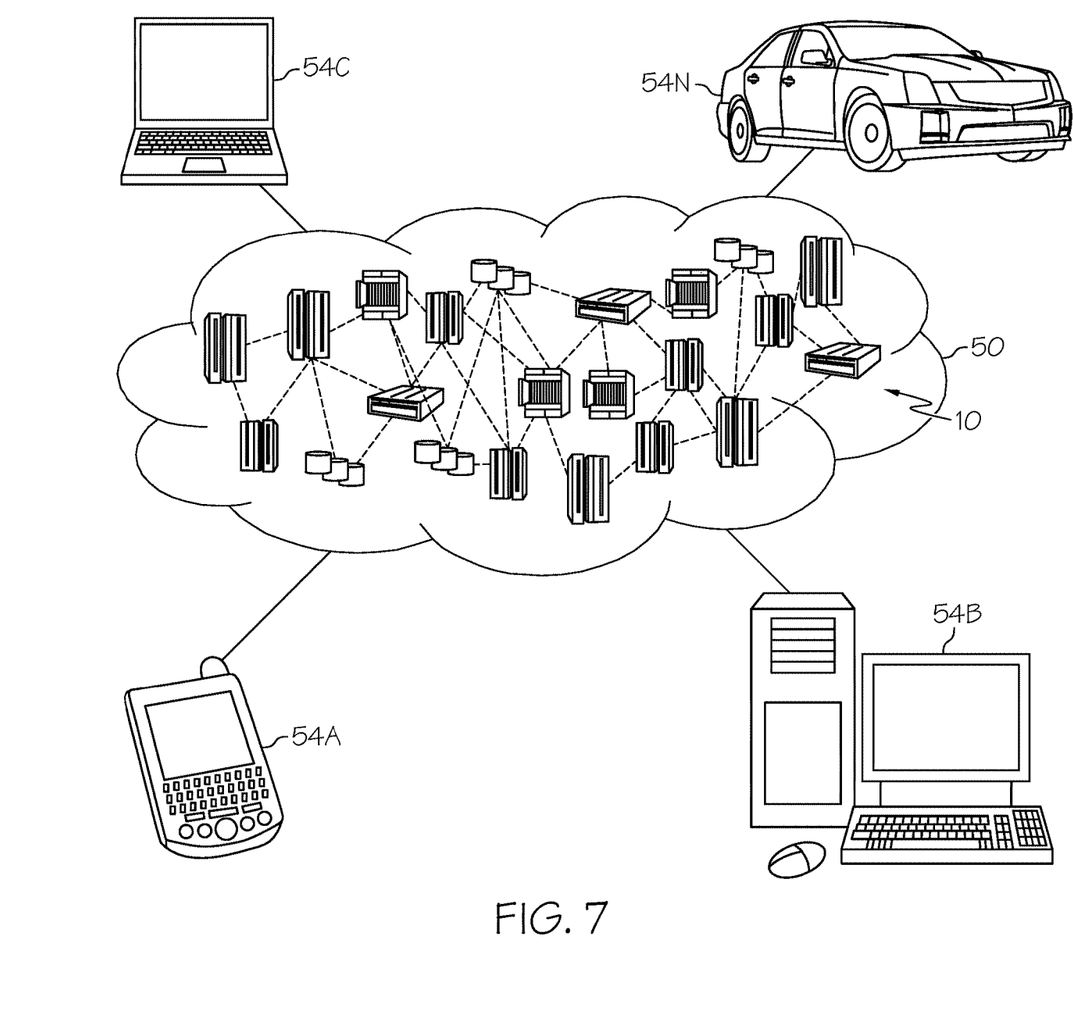
FIG. 7 depicts a cloud computing environment according to an embodiment of the present invention.

Referring now to FIG. 7 illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
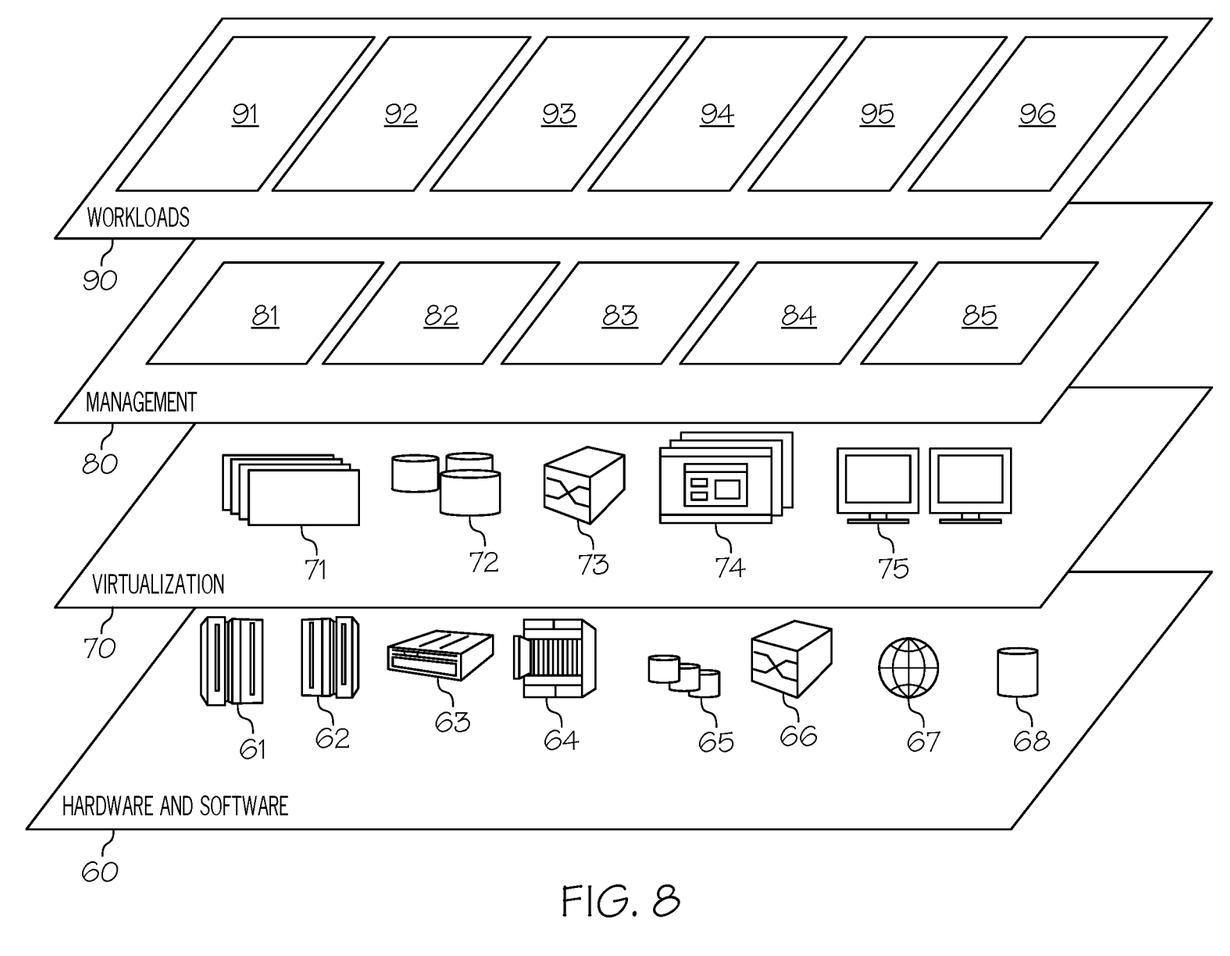
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71;

virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and user authenticating processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present invention are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   detecting, by one or more processors, a real-time initial emotional state of a user, wherein the real-time initial emotional state of the user is a current version of an emotional state of the user that dynamically changes over time, and wherein detecting the real-time initial emotional state of the user in real-time is performed by:
      identifying, by the one or more processors, a time of day for the real-time; and
      determining, by the one or more processors, the real-time initial emotional state of the user based on the time of day for the real-time;
   presenting, by the one or more processors, content to the user as a stimulus to the user, wherein the content is presented after the user is in the real-time initial emotional state;
   predicting, by the one or more processors, a predicted post-stimulus emotional state of the user, wherein the predicted post-stimulus emotional state of the user is predicted to be caused by the content being presented to the user, and wherein the predicted post-stimulus emotional state is dependent upon the real-time initial emotional state of the user;
   detecting, by the one or more processors, a real-time post-stimulus emotional state of the user, wherein the real-time post-stimulus emotional state of the user is caused by the content being presented to the user, and wherein the real-time post-stimulus emotional state is dependent upon the real-time initial emotional state of the user;
   matching, by the one or more processors, the predicted post-stimulus emotional state of the user to the real-time post-stimulus emotional state of the user; and
   in response to the real-time post-stimulus emotional state of the user matching the predicted post-stimulus emotional state of the user, authenticating the user, by the one or more processors, and activating, by the one or more processors, an access mechanism for a device.

2. The method of claim 1, further comprising:
   data mining, by the one or more processors, a calendar of the user to identify a current activity of the user;
   determining, by the one or more processors, the real-time initial emotional state of the user based on the current activity of the user; and
   further predicting, by the one or more processors, the predicted post-stimulus emotional state of the user based on the current activity of the user.

3. The method of claim 1, further comprising:
   determining, by the one or more processors, a real-time location of the user; and
   determining, by the one or more processors, the real-time initial emotional state of the user based on the real-time location of the user.

4. The method of claim 1, further comprising:
identifying, by the one or more processors, other persons who are with the user in real-time; and
determining, by the one or more processors, the real-time initial emotional state of the user based on the other persons who are with the user in real-time.

5. The method of claim 1, further comprising:
identifying, by the one or more processors, a date of the real-time; and
determining, by the one or more processors, the real-time initial emotional state of the user based on the date of the real-time.

6. The method of claim 1, wherein the content is a visual image of a physical scene.

7. The method of claim 1, wherein the content is text content.

8. The method of claim 1, wherein the content is audio content.

9. The method of claim 1, wherein the content is audio-visual content.

10. The method of claim 1, wherein the predicted post-stimulus emotional state of the user is predicted by:
inputting, by the one or more processors, data that describes the real-time initial emotional state of the user and the content into a neural network (NN), wherein an output of the NN describes the predicted post-stimulus emotional state of the user.

11. The method of claim 10, further comprising:
determining, by the one or more processors, that the output of the NN fails to describe the predicted post-stimulus emotional state of the user; and
adjusting neurons in the NN until the output of the NN describes the predicted post-stimulus emotional state of the user.

12. A computer program product comprising a computer readable storage medium having program code embodied therewith, wherein the computer readable storage medium is not a transitory signal per se, and wherein the program code is readable and executable by a processor to perform a method comprising:
detecting a real-time initial emotional state of a user, wherein the real-time initial emotional state of the user is a current version of an emotional state of the user that dynamically changes over time, and wherein detecting the real-time initial emotional state of the user in real-time is performed by:
identifying a time of day for the real-time; and
determining the real-time initial emotional state of the user based on the time of day for the real-time;
presenting content to the user as a stimulus to the user, wherein the content is presented after the user is in the real-time initial emotional state;
predicting a predicted post-stimulus emotional state of the user, wherein the predicted post-stimulus emotional state of the user is predicted to be caused by the content being presented to the user, and wherein the predicted post-stimulus emotional state is dependent upon the real-time initial emotional state of the user;
detecting a real-time post-stimulus emotional state of the user, wherein the real-time post-stimulus emotional state of the user is caused by the content being presented to the user, and wherein the real-time post-stimulus emotional state is dependent upon the real-time initial emotional state of the user;
matching the predicted post-stimulus emotional state of the user to the real-time post-stimulus emotional state of the user; and
in response to the real-time post-stimulus emotional state of the user matching the predicted post-stimulus emotional state of the user, authenticating the user and activating an access mechanism for a device.

13. The computer program product of claim 12, wherein the method further comprises:
data mining a calendar of the user to identify a current activity of the user; and
determining the real-time initial emotional state of the user based on the current activity of the user.

14. The computer program product of claim 12, wherein the method further comprises:
determining a real-time location of the user; and
determining the real-time initial emotional state of the user based on the real-time location of the user.

15. The method of claim 1, wherein the current version of the emotional state of the user that dynamically changes over time is based on experiences of the user.

16. The method of claim 1, wherein the content is randomly chosen for presentation to the user.

17. The computer program product of claim 12, wherein the program instructions are provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
detecting a real-time initial emotional state of a user, wherein the real-time initial emotional state of the user is a current version of an emotional state of the user that dynamically changes over time, and wherein detecting the real-time initial emotional state of the user in real-time is performed by:
identifying a time of day for the real-time; and
determining the real-time initial emotional state of the user based on the time of day for the real-time;
presenting content to the user as a stimulus to the user, wherein the content is presented after the user is in the real-time initial emotional state;
predicting a predicted post-stimulus emotional state of the user, wherein the predicted post-stimulus emotional state of the user is predicted to be caused by the content being presented to the user, and wherein the predicted post-stimulus emotional state is dependent upon the real-time initial emotional state of the user;
detecting a real-time post-stimulus emotional state of the user, wherein the real-time post-stimulus emotional state of the user is caused by the content being presented to the user, and wherein the real-time post-stimulus emotional state is dependent upon the real-time initial emotional state of the user;
matching the predicted post-stimulus emotional state of the user to the real-time post-stimulus emotional state of the user; and
in response to the real-time post-stimulus emotional state of the user matching the predicted post-stimulus emotional state of the user, authenticating the user and activating an access mechanism for a device.

19. The computer system of claim 18, wherein the program instructions are provided as a service in a cloud environment.

* * * * *